US008614732B2

(12) United States Patent
Baird et al.

(10) Patent No.: US 8,614,732 B2
(45) Date of Patent: Dec. 24, 2013

(54) SYSTEM AND METHOD FOR PERFORMING DISTRIBUTED MULTIPOINT VIDEO CONFERENCING

(75) Inventors: Randall B. Baird, Austin, TX (US); Scott S. Firestone, Mountain View, CA (US); Luke K. Surazski, San Jose, CA (US); Duanpei Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2223 days.

(21) Appl. No.: 11/210,325

(22) Filed: Aug. 24, 2005

(65) Prior Publication Data
US 2007/0064901 A1 Mar. 22, 2007

(51) Int. Cl.
*H04N 7/15* (2006.01)
(52) U.S. Cl.
CPC .................................... *H04N 7/15* (2013.01)
USPC ................... 348/14.08; 348/14.09; 348/14.12
(58) Field of Classification Search
CPC .............. H04N 7/14; H04N 7/15; H04M 3/42
USPC ............ 348/14.01–14.16, 420.1; 375/240.12, 375/240.2; 370/260, 261
See application file for complete search history.

(56) References Cited

U.S. PATENT DOCUMENTS

| | | | |
|---|---|---|---|
| 4,574,374 A * | 3/1986 | Scordo | 370/265 |
| 4,701,906 A | 10/1987 | Ransom et al. | |
| 4,703,475 A | 10/1987 | Dretzka et al. | |
| 5,007,046 A | 4/1991 | Erving et al. | 370/32.1 |
| 5,058,153 A | 10/1991 | Carew et al. | 379/390 |
| 5,151,899 A | 9/1992 | Thomas et al. | |
| 5,848,098 A | 12/1998 | Cheng et al. | 375/220 |
| 6,078,809 A | 6/2000 | Proctor | 455/416 |
| 6,128,649 A | 10/2000 | Smith et al. | 709/217 |
| 6,148,068 A | 11/2000 | Lowery et al. | 379/202 |
| 6,535,604 B1 | 3/2003 | Provencal et al. | 379/388.06 |
| 6,989,856 B2 | 1/2006 | Firestone et al. | 348/14.09 |
| 7,061,873 B2 * | 6/2006 | Ito et al. | 370/252 |
| 7,113,992 B1 * | 9/2006 | Even | 709/227 |
| 7,362,350 B2 | 4/2008 | Cutler | |
| 2002/0065928 A1 | 5/2002 | Senga et al. | |

(Continued)

OTHER PUBLICATIONS

U.S. Appl. No. 11/369,072 entitled, *"Facilitating Packet Flow in a Communication Network Implementing Load Balancing and Security Operations"*, 27 pages specification, claims and abstract, 1 page of drawings, inventors Hien T. Thai, et al., Filed Mar. 6, 2006.

(Continued)

*Primary Examiner* — Melur Ramakrishnaiah
(74) *Attorney, Agent, or Firm* — Baker Botts L.L.P.

(57) ABSTRACT

According to an embodiment of the present invention, an apparatus for performing video conferencing is provided that includes an I-frame injector element operable to intercept I-frame requests from one or more end points and to attempt to service the I-frame requests such that at least a portion of the requests are prevented from propagating back to an originating sender. In more specific embodiments, when a receiver endpoint sends a fast video update (FVU) request upstream, it is intercepted by the I-frame injector element and rather than passing the FVU request to the sender the I-frame injector element replaces a next P-frame from the sender with an I-frame, whereby the I-frame is constructed so that when decoded, it matches the P-frame that it replaced. In still more detailed embodiments, the I-frame injector element operates in one of three modes that are associated with bandwidth parameters.

18 Claims, 5 Drawing Sheets

(56) References Cited

U.S. PATENT DOCUMENTS

| | | | |
|---|---|---|---|
| 2002/0080752 A1 | 6/2002 | Johansson et al. | 370/338 |
| 2003/0081607 A1 | 5/2003 | Kavanagh | 370/392 |
| 2004/0047342 A1 | 3/2004 | Gavish et al. | |
| 2004/0088409 A1 | 5/2004 | Braemer et al. | |
| 2004/0107234 A1 | 6/2004 | Rajahalme | |
| 2004/0146045 A1 | 7/2004 | Jimmei et al. | |
| 2004/0252761 A1* | 12/2004 | Brown et al. | 375/240.12 |
| 2005/0005006 A1 | 1/2005 | Chauffour et al. | |
| 2005/0033758 A1 | 2/2005 | Baxter | |
| 2005/0122942 A1 | 6/2005 | Rhee et al. | 370/338 |
| 2005/0165928 A1 | 7/2005 | Shu et al. | 709/224 |
| 2005/0281205 A1 | 12/2005 | Chandwadkar et al. | 370/249 |
| 2006/0293073 A1* | 12/2006 | Rengaraju et al. | 455/518 |
| 2010/0030906 A1 | 2/2010 | Apreutesei et al. | |

OTHER PUBLICATIONS

Cisco IOS Mobile Wireless Configuration Guide, Chapter 11, Configuring Load Balancing on the GGSN, www.cisco.com, pp. 11-1-11-28, Printed Feb. 2006.

Cisco IOS Mobile Wireless Configuration Guide, Configuring Load Balancing on the GGSN, www.cisco.com, pp. MWC-221-MWC-238, Printed Feb. 2006.

United States Patent and Trademark Office, Office Action for U.S. Appl. No. 11/369,072, filed Mar. 6, 2006, in the name of Hien T. Thai, 14 pages, Nov. 28, 2008.

United States Patent and Trademark Office, Final Office Action for U.S. Appl. No. 11/369,072, filed Mar. 6, 2006, in the name of Hien T. Thai, 21 pages, Jun. 10, 2009.

USPTO; Office Action dated Dec. 28, 2009 for U.S. Appl. No. 11/369,072, filed Mar. 6, 2006 in the name of Hien T. Thai, 26 pages, Dec. 28, 2009.

"Videoconferencing" from Wikipedia, the free encyclopedia, http://en.wikipedia.org/wiki/Video_conference, pp. 1-5, Printed Feb. 13, 2006.

U.S. Appl. No. 11/421,622, entitled "*Marking Keyframes for a Communication System*", 28 pages specification, claims, and abstract, 3 pages of drawings, inventors Duanpei Wu, et al., Jun. 1, 2006.

USPTO; Office Action dated Nov. 15, 2007 for U.S. Appl. No. 11/421,622, filed Jun. 1, 2006 in the name of Duanpei Wu, 16 pages, Nov. 15, 2007.

USPTO; Office Action dated May 27, 2008 for U.S. Appl. No. 11/421,622, filed Jun. 1, 2006 in the name of Duanpei Wu, 15 pages, May 27, 2008.

USPTO; Final Office Action dated Nov. 24, 2008 for U.S. Appl. No. 11/421,622, filed Jun. 1, 2006 in the name of Duanpei Wu, 12 pages, Nov. 24, 2008.

USPTO; Office Action dated Mar. 16, 2009 for U.S. Appl. No. 11/421,622, filed Jun. 1, 2006 in the name of Duanpei Wu, 9 pages, Mar. 16, 2009.

USPTO; Final Office Action dated Sep. 29, 2009 for U.S. Appl. No. 11/421,622, filed Jun. 1, 2006 in the name of Duanpei Wu, 10 pages, Sep. 29, 2009.

USPTO; Office Action dated Aug. 3, 2010 for U.S. Appl. No. 11/421,622, filed Jun. 1, 2006 in the name of Duanpei Wu, 15 pages.

USPTO; Office Action dated Sep. 14, 2011 for U.S. Appl. No. 11/369,072, filed Mar. 6, 2006 in the name of Hien T. Thai, 22 pages.

USPTO; Office Action dated Oct. 28, 2010 for U.S. Appl. No. 11/369,072, filed Mar. 6, 2006 in the name of Hien T. Thai, 25 pages.

Response to Office Action dated Nov. 28, 2008 for U.S. Appl. No. 11/369,072, filed Mar. 6, 2006 in the name of Hien T. Thai, 13 pages, Feb. 27, 2009.

Request for Continued Examination Transmittal and Amendment Filed with Request for Continued Examination for U.S. Appl. No. 11/369,072, filed Mar. 6, 2006 in the name of Hien T. Thai, 14 pages, Oct. 1, 2009.

Response to Office Action dated Dec. 28, 2009 for U.S. Appl. No. 11/369,072, filed Mar. 6, 2006 in the name of Hien T. Thai, 13 pages, Mar. 29, 2010.

Request for Continued Examination Transmittal and Amendment Filed with Request for Continued Examination for U.S. Appl. No. 11/369,072, filed Mar. 6, 2006 in the name of Hien T. Thai, 15 pages, Aug. 23, 2010.

Response to Office Action dated Oct. 28, 2010 for U.S. Appl. No. 11/369,072, filed Mar. 6, 2006 in the name of Hien T. Thai, 15 pages, Jan. 27, 2011.

Request for Continued Examination Transmittal and Amendment Filed with Request for Continued Examination for U.S. Appl. No. 11/369,072, filed Mar. 6, 2006 in the name of Hien T. Thai, 15 pages, Jul. 15, 2011.

USPTO, Final Office Action dated Mar. 6, 2012 for U.S. Appl. No. 11/369,072, filed Mar. 6, 2006 in the name of Hien T. Thai, 24 pages.

Request for Continued Examination Transmittal and Amendment Filed with Request for Continued Examination for U.S. Appl. No. 11/369,072, filed Jun. 6, 2012 in the name of Hien T. Thai.

USPTO, Nonfinal Office Action dated Jul. 9, 2012 for U.S. Appl. No. 11/369,072, filed Mar. 6, 2006 in the name of Hien T. Thai.

Response to Office Action dated Jul. 9, 2012 for U.S. Appl. No. 11/369,072, filed Mar. 6, 2006 in the name of Hien T. Thai.

USPTO, Notice of Allowance and Fees Due for U.S. Appl. No. 11/369,072, filed Mar. 6, 2006 in the name of Hien T. Thai, Dec. 26, 2012.

Response to Office Action dated Sep. 14, 2011 for U.S. Appl. No. 11/369,072, filed Mar. 6, 2006 in the name of Hien T. Thai, 14 pages.

USPTO; Office Action dated Apr. 15, 2011 for U.S. Appl. No. 11/369,072, filed Mar. 6, 2006 in the name of Hien T. Thai, 19 pages.

* cited by examiner

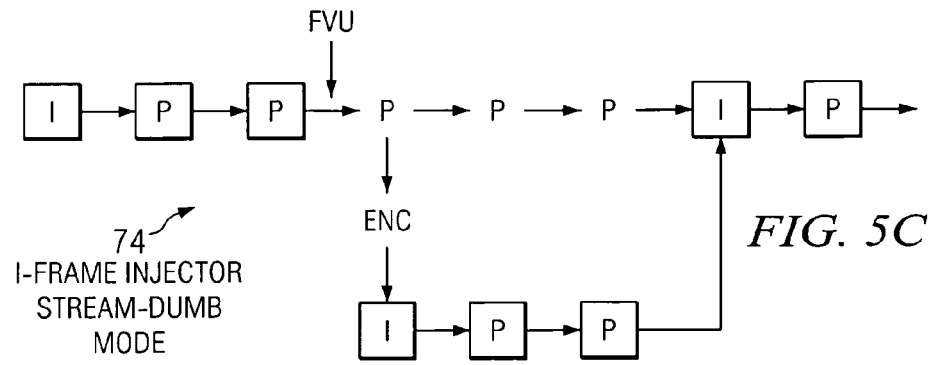
FIG. 5C
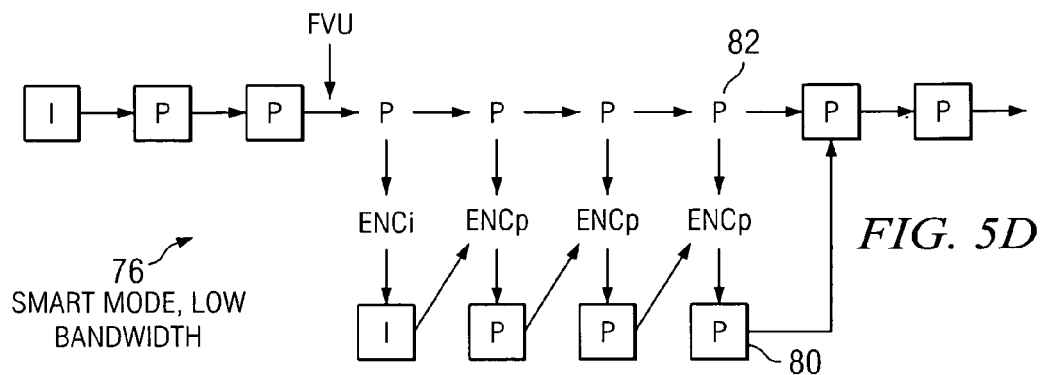
FIG. 5D
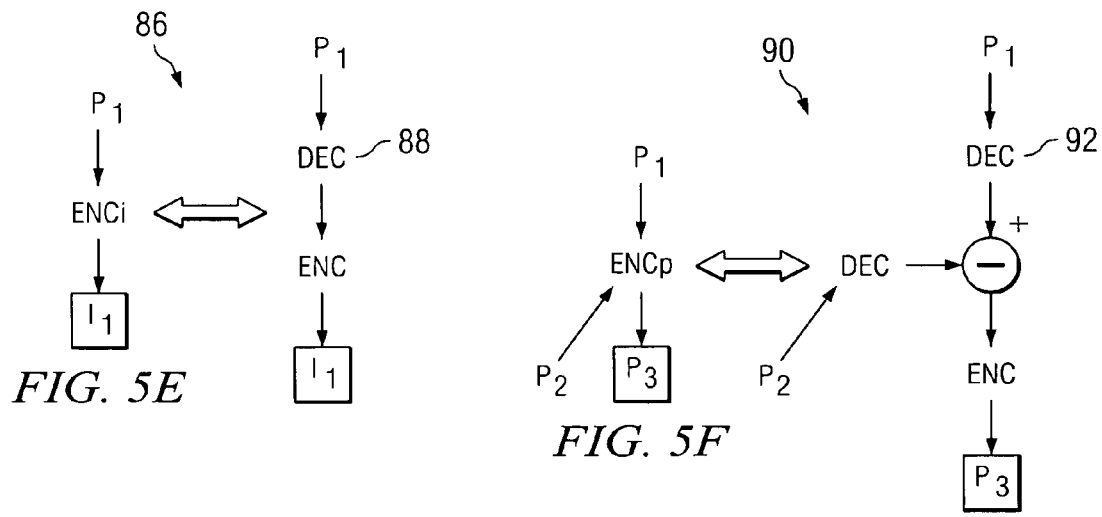
FIG. 5E
FIG. 5F
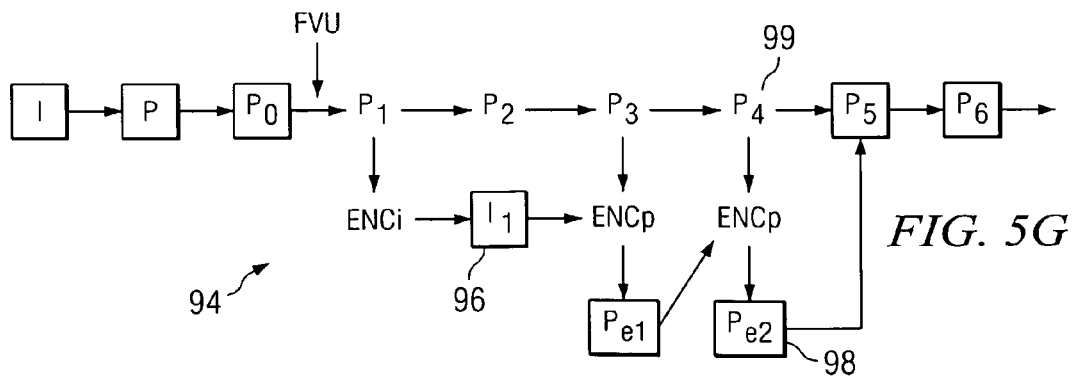
FIG. 5G

SYSTEM AND METHOD FOR PERFORMING DISTRIBUTED MULTIPOINT VIDEO CONFERENCING

TECHNICAL FIELD OF THE INVENTION

This invention relates in general to the field of communications and, more particularly, to a system and a method for performing distributed multipoint video conferencing.

BACKGROUND OF THE INVENTION

Networking architectures and the field of video conferencing have grown increasingly complex in communications environments. In addition, the augmentation of clients or end users wishing to communicate in such environments has caused many networking configurations and systems to respond by adding elements to accommodate the increase in networking traffic. Communication tunnels or links may be used in order to establish a communication flow, whereby an end user or an object may initiate a video or an audio session to facilitate a particular call or conference. Selected locations within the communication architecture may be accessed or designated to conduct the communication session. The selected location or network point may then provide a platform that the end user may use to execute a communication session.

The traditional approach to video conferencing is to use a centralized multipoint control unit (MCU). This sets up media streams from the end points to a conference server where the streams may be mixed and then sent back to the end points as individual streams. The mixing may include composition (for example), creating a two-by-two composition of four video streams. Each of these sub-streams can be locked to a particular user or voice-switched where appropriate. Other possible compositions can be one-by-one, one-by-two, three-by-three, etc.

It is critical that timing and synchronization be precise in such video-conferencing scenarios. Additionally, bandwidth considerations should be recognized and appreciated in attempting to accommodate optimal video conferences. Moreover, minimizing central processing unit (CPU) loads and response times to I-frame requests is critical for such an architecture. Accordingly, the ability to provide an effective mechanism to properly direct communications for an end user/end point, or to offer an appropriate protocol that optimizes bandwidth characteristics provides a significant challenge to network operators, component manufacturers, and system designers.

SUMMARY OF THE INVENTION

From the foregoing, it may be appreciated by those skilled in the art that a need has arisen for an improved communications approach that provides for more appropriate data-routing procedures to achieve optimal data management in a video conferencing environment. In accordance with one embodiment of the present invention, a system and a method for performing distributed multipoint video conferencing is provided that greatly reduces disadvantages and problems associated with conventional information distribution techniques.

Note that for purposes of clarity and discussion, it may be beneficial to understand some of the components provided in the present conferencing architecture. In general, a network core and a network edge may be provided in such an arrangement. One or more end points may attach to a distributed multipoint control unit (MCU) via a media switch. The media switch may provide an interface from the edge of the network to the core of the network. In the core, the media distribution can be optimized, whereby such optimizations can be transparent to the end points. The core distribution may be switched or fixed.

According to an embodiment of the present invention, an apparatus for performing video conferencing is provided that includes an I-frame injector element operable to intercept I-frame requests from one or more end points and to attempt to service the I-frame requests such that at least a portion of the requests are prevented from propagating back to an originating sender.

In more specific embodiments, when a receiver endpoint sends a fast video update (FVU) request upstream, it is intercepted by the I-frame injector element and rather than passing the FVU request to the sender the I-frame injector element replaces a next P-frame from the sender with an I-frame, whereby the I-frame is constructed so that when decoded, it matches the P-frame that it replaced. In still more detailed embodiments, the I-frame injector element operates in one of three modes that are associated with bandwidth parameters. These modes are described in great detail below with reference to corresponding FIGURES.

Certain embodiments of the present invention may provide a number of technical advantages. For example, according to one embodiment of the present invention, a video conferencing architecture is provided that allows for enhanced performance. In the distributed MCU architecture, the I-frame injector can be situated on media switches to intercept fast video update (FVU) requests from endpoints in the subnet. The FVU requests are serviced by the I-frame injector, rather than being forwarded to the originating sender. As a result, endpoints receive I-frames faster. In addition, the I-frame injector reduces the average bandwidth over the core of the network (e.g. the wide area network (WAN)) by reducing the number of I-frames that must be issued by the originating sender. Also, the I-frame injector prevents higher bandwidth I-frames from flooding all endpoints in the distributed MCU mesh because the I-frames are limited to the subnet of the media switch. This feature is especially helpful if the subnet at the edge is a suspect wireless link that could potentially be the cause of an I-frame storm.

Another advantage associated with one embodiment of the present invention is that there may be more bandwidth available on the local subnet than there is on the WAN. As a result, the I-frame injector may be able to send a high-quality I-frame very quickly. This I-frame would be large and, further, could be sent with back-to-back packets. In contrast to this optimal scenario, a sender that is emitting an I-frame for transmission over the WAN may be constrained to a smaller bit-rate and stretch the I-frame out over a longer period of time. This would result in longer delays.

There are a number of additional advantages associated with the present invention. Many of these advantages are discussed more fully below with respect to corresponding FIGURES, which elucidate many of the enhancements provided by the present invention. It is imperative to note that certain embodiments of the present invention may enjoy some, all, or none of these advantages. Other technical advantages may be readily apparent to one skilled in the art from the following figures, descriptions, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 5A-5G are simplified flow diagrams associated with example embodiments of the present invention.

DETAILED DESCRIPTION OF EXAMPLE EMBODIMENTS OF THE INVENTION

Figure 1:
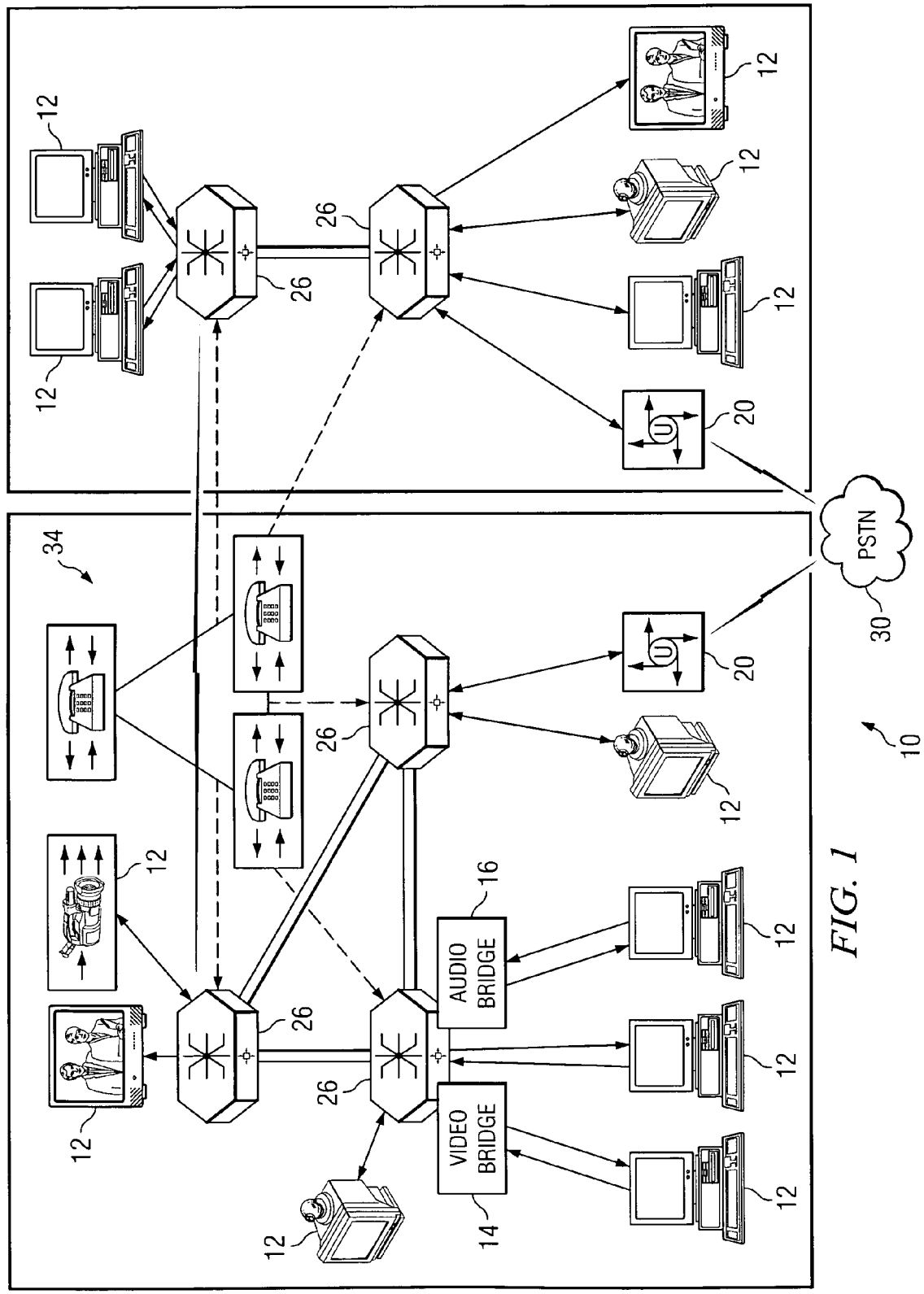
FIG. 1 is a simplified block diagram of a communication system for performing distributed video conferencing in accordance with one embodiment of the present invention.

FIG. 1 is a simplified block diagram of a communication system 10 for communicating data in a network environment. Communication system 10 includes multiple end points 12, which are illustrated in FIG. 1 as representative of various devices and components (e.g. audio internet protocol (IP) phones, video phone appliances, personal computer (PC) based video phones, and streaming clients). Communication system 10 may also include a plurality of gateways 20 that provide connectivity to each other via a public switched telephone network (PSTN) 30. Communication system 10 may also include a plurality of media switches 26 (which may be abbreviated as MS or MSs herein in this document) that may be coupled to each other, gateways 20, and various end points 12. Additionally, communication system 10 may include a set of call agents 34 (e.g. a centralized call manager) that may be coupled to media switches 26. In addition, communication system 10 may include any number of suitable applications (e.g. conference manager (CM), video conferencing scheduler, user conference control, directory services, and network management tools), etc.

A video conference, in the context of communication system 10, may be defined as a set of video streams. These streams may be classified as fixed video (FV) and switched video (SV) streams. An FV stream originates from the same source for the duration of the conference; an SV stream can originate from different sources during the same conference. The switching of the source from one given end point to another may be controlled by one of several criteria (e.g. the active audio speaker, the person controlling a shared whiteboard, the moderator's choice etc.). Each end point 12, which is part of the conference, may receive a subset of all the streams in the conference. The particular subset received by an end point provides the user with an experience of the conference for that end point and can be different for different end points.

Figure 2:
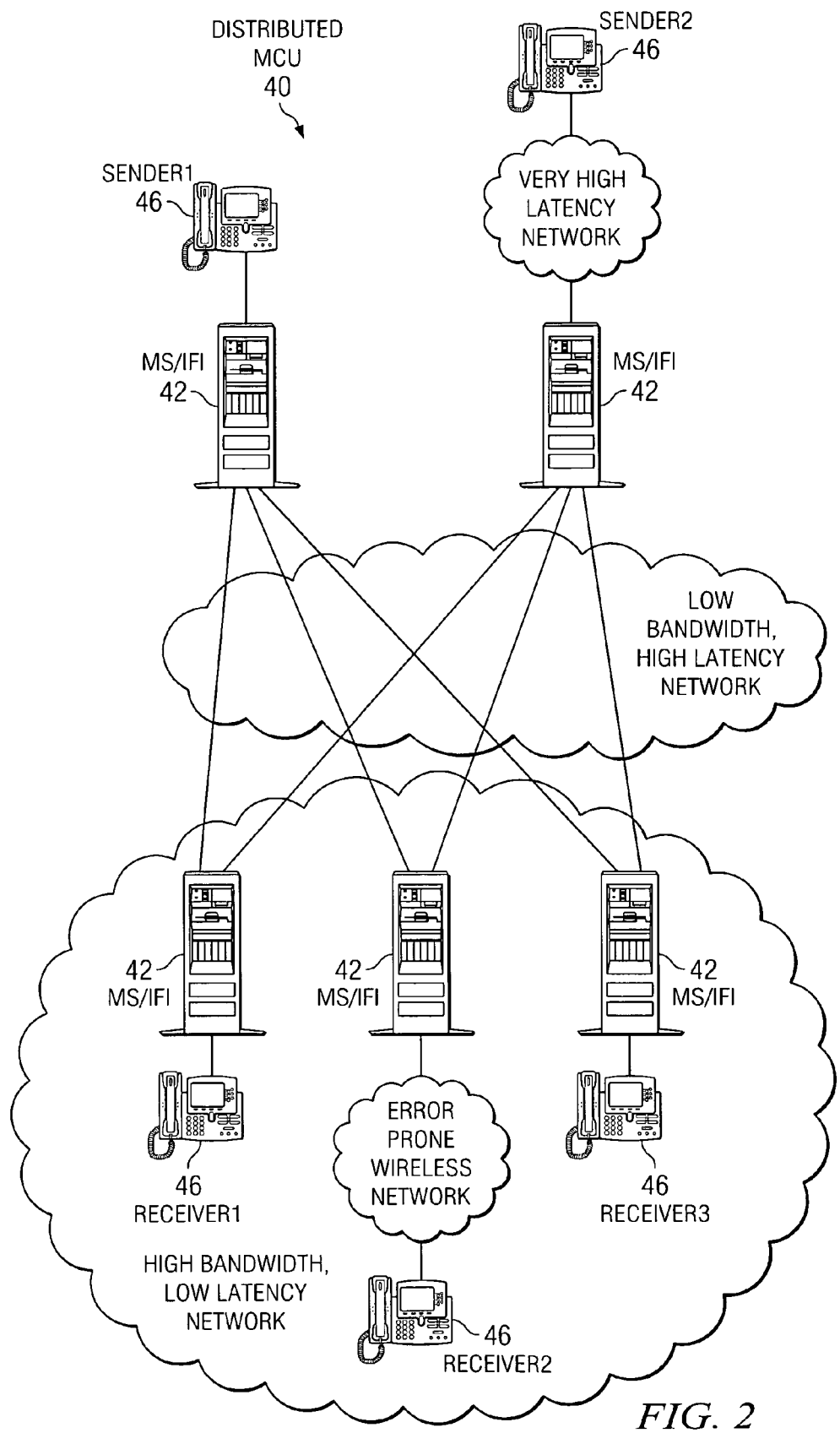
FIG. 2 is a simplified block diagram illustrating an example architecture associated with one or more media switches and one or more I-frame injectors that are included in the communication system.

FIG. 2 is a simplified block diagram of a distributed multipoint control unit (MCU) embodiment of the present invention. For purposes of explanation and discussion, FIGS. 1 and 2 are described together. FIG. 2 includes a low bandwidth, high latency network and a high bandwidth, low latency network. FIG. 2 also includes a number of media switches 42, which include an I-frame injector (IFI) provided therein or coupled thereto. A number of receivers and senders 46 are also provided in FIG. 2.

FIGS. 1 and 2 may be generally configured or arranged to be deployed with different call control protocol architectures, fitting in either a centralized architecture (e.g. a centralized call processing scenario) or a distributed architecture. Either architecture can use a session initiation protocol (SIP) to establish calls. The configuration changes implied by this architecture may affect the application, call control, and media layers in accordance with particular embodiments of the present invention.

In accordance with the teachings of the present invention, communication system 10 provides a platform that allows for the ability to effectively distribute video conferencing data in an optimal fashion. An I-frame injector, which is provided in conjunction with one or more of the media switches 26, implements a number of functionalities in a way that is beneficial for network participants. The I-frame injector, which is detailed more fully in subsequent FIGURES, operates as part of a distributed video MCU architecture that attempts to: 1) minimize response time to I-frame requests from leaf endpoints; 2) reduce the bandwidth across the wide area network (WAN) in a distributed MCU architecture; and 3) minimize the set of endpoints in the distributed MCU architecture that receive large I-frames due to any fast video update (FVU). This may all be achieved while minimizing the central processing unit (CPU) load, which is always present.

Hence, the I-frame injector is an enhancement to a distributed video MCU architecture. In this architecture, each subnet (or group of video endpoints) is associated with a media switch. Media switches are typically placed at the edge of the network and can bridge video streams between the core of the network and the subnet containing the endpoints. Each media switch coordinates with other media switches to minimize the video traffic that must flow across the core of the network. By switching on and off unneeded streams, the media switches implement a distributed video MCU efficiently. The basic idea is that in a voice-activated switched (VAS) conference, only the video of the current active speaker (and maybe the previous active speaker) from one subnet will be forwarded across the core of the network to other media switches that subscribe to the conference.

In this distributed architecture, when an endpoint becomes the active sender, it is considered to be at the top of the distribution tree and the receiving endpoints can be considered the leaves. The I-frame injector idea proposed here improves the performance of the entire distributed MCU for scenarios when a leaf endpoint issues an FVU request to the sender. The I-frame injector can reside on each media switch and it intercepts I-frame requests from the leaf endpoints. The I-frame injector attempts to service the I-frame request and to prevent the request from propagating back to the originating sender at the top of the tree. As a result, the I-frame injector increases the usability of a distributed video MCU.

Other systems are deficient in these operations because they include brute-force MCUs that attempt to decode every input video stream before mixing has been completed. The MCUs then mix the video and re-encode every output stream after mixing. The present invention overcomes these inadequacies (and others) in offering an architecture that is operable to minimize response time to I-frame requests from leaf endpoints in a distributed MCU architecture, reduce the bandwidth across the WAN in a distributed MCU architecture, and minimize the set of endpoints in the distributed MCU architecture that receive large I-frames due to FVU.

The I-frame injector can be viewed as an IP-to-IP gateway that resides in the network path between a video sender and a video receiver. The injector normally passes a video bitstream untouched from input to output. While passing the bit-stream, the injector internally decodes the video stream and keeps the most recently decoded frame in memory. The I-frame injector comes into play when dropped packets occur downstream of the I-frame injector. In this case, the receiver endpoint sends a fast update request upstream, which is intercepted by the injector. Rather than passing the FVU request to the sender, the injector replaces the next P-frame from the sender with an I-frame. The I-frame is constructed so that when decoded, it exactly matches the P-frame that it replaced. The I-frame injector then reverts back to a pass-through mode. The endpoint receives the I-frame from the injector and then continues to receive seamless bit-stream from the originating source.

For each bit-stream handled by the I-frame injector, the I-frame injector should have the CPU power to constantly decode the video bit-stream and to encode an I-frame when necessary. I-frame encoding/decoding is very similar to JPEG encoding/decoding because no motion estimation or motion compensation is generally required. The CPU power needed to encode an I-frame is about equal to the processing power needed to decode an I-frame. Additional details relating to the I-frame operations and processing are provided below with reference to subsequent FIGURES.

The following discussion provides some foundational information, which highlights some of the features of communication system 10. Subsequently, the audience is directed to FIGS. 3-5G, which help to detail specific potential implementations of the present invention.

Video conferences can be created on the fly to use any available MCU, rather than specific MCUs. Communication system 10 may dispel notions of reliance on a central MCU and, further, may distribute the video processing functionality throughout the network. Communication system 10 may also optimize bandwidth usage and provide for a degree of customization that is not possible with a centralized MCU approach.

Communication system 10 offers a communications approach that allows for more economical video conferencing configurations. Communication system 10 provides audio/video synchronization of videoconferences when the audio bridge and video bridge are not required to be co-located on the same network device. Note that the video bridge is not necessarily required in every scenario (e.g. voice activated conferences). Affordable desktop video conferencing, as provided by the present architecture, offers a viable solution to any entity seeking to execute optimal conferencing. Additionally, such affordability could lead to the proliferation of video conferencing and, thereby, make such a technology ubiquitous and widely accepted.

Communication system 10 also provides a flexible architecture. The present architecture may allow the network infrastructure already in place to be leveraged instead of using point products. Additionally, each user can have a customized view of the conference by choosing a different subset of FV and SV streams. Moreover, legacy end points may be readily supported with such a configuration, while allowing enhanced end points to provide additional services. In other scenarios, MCUs may be supported for composition, thus preserving any initial equipment investment. In still other scenarios, such an implementation is codec-agnostic. Thus, in the context of new codecs, such as H.264, these codecs can be deployed without requiring upgrades to the entire network infrastructure. Bandwidth usage may also be minimized by suppressing streams and using multicast. Such an embodiment would systematically enable large desktop video conferences.

In operation of an example implementation involving the media layer, end point audio and video streams may be transmitted between end points 12 and their associated media switch 26. Audio and video streams may be routed independently in the core of the network, with the audio streams relying on a central speaker selection function which has access to all audio streams within a single conference. The video streams follow an optimized routing path between MSs, with video processing (i.e. transrating and transcoding) inserted as necessary under control of a conferencing management application. This architecture allows for both network and end point-based video processing. The use of a centralized audio speaker selection scheme permits the architecture to allow the video routing and switching to be optimized, resulting in significant bandwidth optimizations because of the larger amount of bandwidth typically required by 'good' quality video streams. The audio speaker selection mechanism is centralized; this does not mean that the audio mixing needs to be completely centralized, even though this may represent the most common deployment due to its reduced delays as well as to serve legacy audio devices that rely on a central mixer.

One feature of communication system 10 allows for a voice-activated conference with centralized audio to be achieved. In this embodiment, the audio streams from all end points 12 (both audio-only and video-capable) may be sent to a central audio mixer, where the active speaker is determined. This information is then propagated to all media switches 26. Media switches 26 may suppress all video streams except for the active speaker, and the video stream for the active speaker is propagated to all the MSs in the conference using SSM (Source Specific Multicast). Each media switch 26 replicates the video stream for all its local end points, which may be part of the conference. Alternatively, multicast can be used between media switch 26 and its local end points. Audio mixing can be centralized or distributed; the architecture does not require centralized audio.

Note that communication system 10 does not necessarily suppress the audio streams: it suppresses video streams. Also, suppression may be done at media switch 26 and, hence, end points 12 do not need to change or be modified to accommodate such an operation. Additionally, the active speaker can be an audio-only end point in which case the last video stream continues to be propagated. Moreover, the active speakers may receive the video stream corresponding to the last video speaker.

A second feature of communication system 10 allows end points 12 to choose to lock-on to a particular participant of the conference. This capability may be provided through a separate interface or it may be part of the end point functionality at enhanced end points. Also, not all end points 12 may have the ability to lock-on due to bandwidth and other constraints. End points 12 that may be locked-on may stream an FV stream to the conference. Note that the FV-SV stream distinction, as well as the SSM used to propagate this stream, is not visible to the end point itself. This functionality could be implemented in media switch 26. Where multiple end points desire to lock-on to the same participant, they can subscribe to the same SSM stream, or signaling can be exchanged between media switches 26 to set up appropriate unicast streams. Thus, each end point 12 can receive a mixture of FV and SV streams. An end point can choose not to receive any SV streams at all and just receive the FV stream for a particular participant (e.g. a lecture mode with a question and answer session, where an end point may choose to receive only the keynote speaker and hear the audio for the questions). A video composite FV stream represents a case where a video end point may elect not to receive any SV streams.

A third feature of communication system 10 allows the SV stream received by an end point to not be switched based on the active audio speaker, but based on other criteria, such as the person controlling the shared whiteboard. Alternatively, the moderator may choose to switch the video source at appropriate times. There may be multiple SV streams in a single conference and they can use different criteria for switching the source. An end point can choose to receive one, multiple, or none of the SV streams in the conference.

A fourth feature of communication system 10 allows media transformers (e.g. transcoders, transraters, and composition services) to be included in conferences to provide the relevant media services. These can be used as a media bridge, for example. A conference supporting multiple speeds/formats could be supported. The same conference can have a 128 K version and a 384 K version, which may be separate sub-conferences. The transrater may be included in both sub-conferences and transrate the output of one conference into the other. This would work for a SV conference, but an FV stream would utilize its own transrater. Thus, the method in which media transformers may be used in this architecture may depend on the specific needs of the transformation and multiple methods can be used simultaneously. Other media transformers could include internet protocol (IP)/television (TV) broadcast servers, for broadcasting conference, and similar services. Legacy MCUs (e.g. a Radvision MCU) could be used as a composition server in such an architecture to provide composition services.

End points 12 each represent an end user, a client, or a customer wishing to initiate a communication or participate in a video conferencing session in communication system 10. End points 12 may be inclusive of devices used to initiate (or participate in) a communication, such as a computer, a personal digital assistant (PDA), a laptop or an electronic notebook, a telephone, a mobile station, an audio IP phone, a video phone appliance, a personal computer (PC) based video phone, a streaming client, or any other device, component, element, or object capable of initiating voice, video, or data exchanges within communication system 10. End points 12 may also be inclusive of a suitable interface to the human user, such as a microphone, a display, a keyboard, a whiteboard, a video-conferencing interface or bridge, or other terminal equipment. End points 12 may also be any device that seeks to initiate (or participate in) a communication on behalf of another entity or element, such as a program, a database, an application, a piece of software, or any other component, device, element, or object capable of initiating a voice, a video, or a data exchange within communication system 10. Data, as used herein in this document, refers to any type of numeric, voice and audio, video, audio-visual, or script data, or any type of source or object code, or any other suitable information in any appropriate format that may be communicated from one point to another.

As identified supra, a wide range of end points may be supported in the architecture of communication system 10. Legacy audio devices can be mixed with legacy (or new video) capable end points. Legacy end points can be connected in a manner such that its service requirements may be met. For end points needing a voice activated service, intelligent media switching may be utilized unless there may be bandwidth constraints demanding a video transrater to be inserted in the media path or a video transcoder due to codec incompatibilities. For legacy end points facilitating multiple concurrent video images, an MS with video composition capabilities may provide the composite view based on streams available on the network.

Newer end points capable of processing multiple video streams may be connected via a call with multiple video streams to the associated MS in such a way that they can receive several FV and/or SV streams. If these devices support IP multicast, they may also be able to connect to other advanced end points residing on the same network serviced by a single MS (via IP multicast) while also subscribing to speaker selection information distribution in order to get help in deciding which video streams to show at any point in time.

In operation of an example embodiment, end points 12 may join a video conference by calling or being directed to the video conference application. End point calls may go through the centralized call processing. Hence, communication system 10 can support skinny client control protocol (SCCP) and H.323, as well as SIP end points. H.323 end points can join a conference-button conference if they support H.323's empty capability set or if a media termination point (MTP) is used.

Each video-capable end point may transmit and receive all its audio and video streams to and from its locally assigned MS. Audio-only end points may transmit and receive their audio streams to and from the central audio bridge assigned to the conference. A policy director may also be provisioned to provide the policy to individual end points, specifying what type of end point video customization is allowed (e.g. number and types of windows). This may have a direct bearing on how much bandwidth reservation the end points may be allowed to request.

In order to protect any investment in traditional gateways (audio and video) or MCUs, the present architecture is flexible enough to be able to cooperate readily with a wide array of elements. Gateways may behave like H.323 end points that can support multiple calls. Traditional MCUs (e.g. Cisco IP/VC 35XX) can also act as special end points providing video composition services.

Media switches 26 (as abbreviated 'MS' herein in certain segments of this document) may be devices that provide a control interface to the conference manager. Each media switch 26 can perform a number of functions. Each media switch 26 can register its capabilities at startup, which can include any of the following media processing functions: 1) audio mixing that mixes audio of loudest speakers, distributes loudest speaker information to other MSs [Typically, an audio bridge also provides audio transcoding as part of the mixing in order to allow end points using different codecs to natively join the same conference without needing external transcoders.]; 2) audio transcoding that provides audio transcoding (codec translation) services that can be used by other network devices without necessary resources (e.g. DSPs) to perform audio transcoding on their own; 3) video composition that processes video by creating a composite view (i.e. Hollywood Squares scenario) of a set of participants [Typically, video composition can also provide video transrating and transcoding in order to allow end points using different rates or codecs to natively join the same conference without needing external transraters or transcoders.]; 4) video transrating that provides video transrating (bandwidth reduction by changing video quantization parameters) service that can be used by other network devices without necessary resources (e.g. DSPs) to perform video transrating on their own; 5) video transcoding that provides video transcoding (codec translation) services that can be used by other network devices without necessary resources (e.g. DSPs) to perform video transcoding on their own; 6) media switching that represents the interface between the edge of the network (toward end points) and the core of the network (toward other media switches).

The video distributing and suppressing function is referred to as the media switching function and this may be implemented in media switches 26 throughout the network or, alternatively, implemented in conjunction with video bridge 14 and audio bridge 16 without the need to implicate any media switch 26. The embodiment of FIG. 1, inclusive of a potential active role for media switches 26, has been illustrated for purposes of providing one example only. Note also that while the subsequent operations and capabilities are described with reference to media switches 26, these functionalities may be readily performed by audio bridge 16 or video bridge 14 (or any combination thereof). Such capabilities have been described with reference to media switches 26 for teaching purposes only.

Additionally, existing network devices such as routers, gateways, servers, CPUs, bridges, switches, and wireless access points may provide the MS functionality (and thus are included within the broad definition of 'media switch'). Communication system 10 does not necessarily require a video digital signal processor (DSP). The MS functionality can be included as a software (in one example) feature in network operating systems such as Cisco IOS, Cisco CatOS, or in any other general-purpose operating system. End points 12 may connect to their nearest media switch 26 and send it their audio and video streams. To a given end point, media switch 26 may provide the MCU function, whereby the distributed nature of the conference is not visible to the end point. Thus, legacy H.323 end points can participate in a distributed conference with no changes required on the end point side. These end points can be referred as the local end points of the MS. Video streams can be distributed in a variety of ways. One architecture may use source-specific multicast (SSM), but communication system 10 allows generic multicast, unicast or multicast over unicast tunnels, or other suitable protocols to be used as the distribution mechanism.

Based on the services performed by an MS device, such applications may merit video processing DSPs, audio processing DSPs, or no DSPs at all. Combining several of the functions described above into a single network device allows the number of call legs involved in any media transmission to be reduced, which can avoid excessive delays in certain embodiments.

As part of the media switching function, MSs may be responsible for replicating packets in order to fan out unidirectional video streams so that all other MSs participating in the same conference can receive them. Any of the call legs (input or outputs) may use point-to-point or multicast call legs, allowing network infrastructures to take advantage of IP multicast at the core of the network if available (or allowing a reversion to a mesh of point-to-point calls in other scenarios). The edge transport mechanism is independent of the core transport mechanisms.

Figure 3:
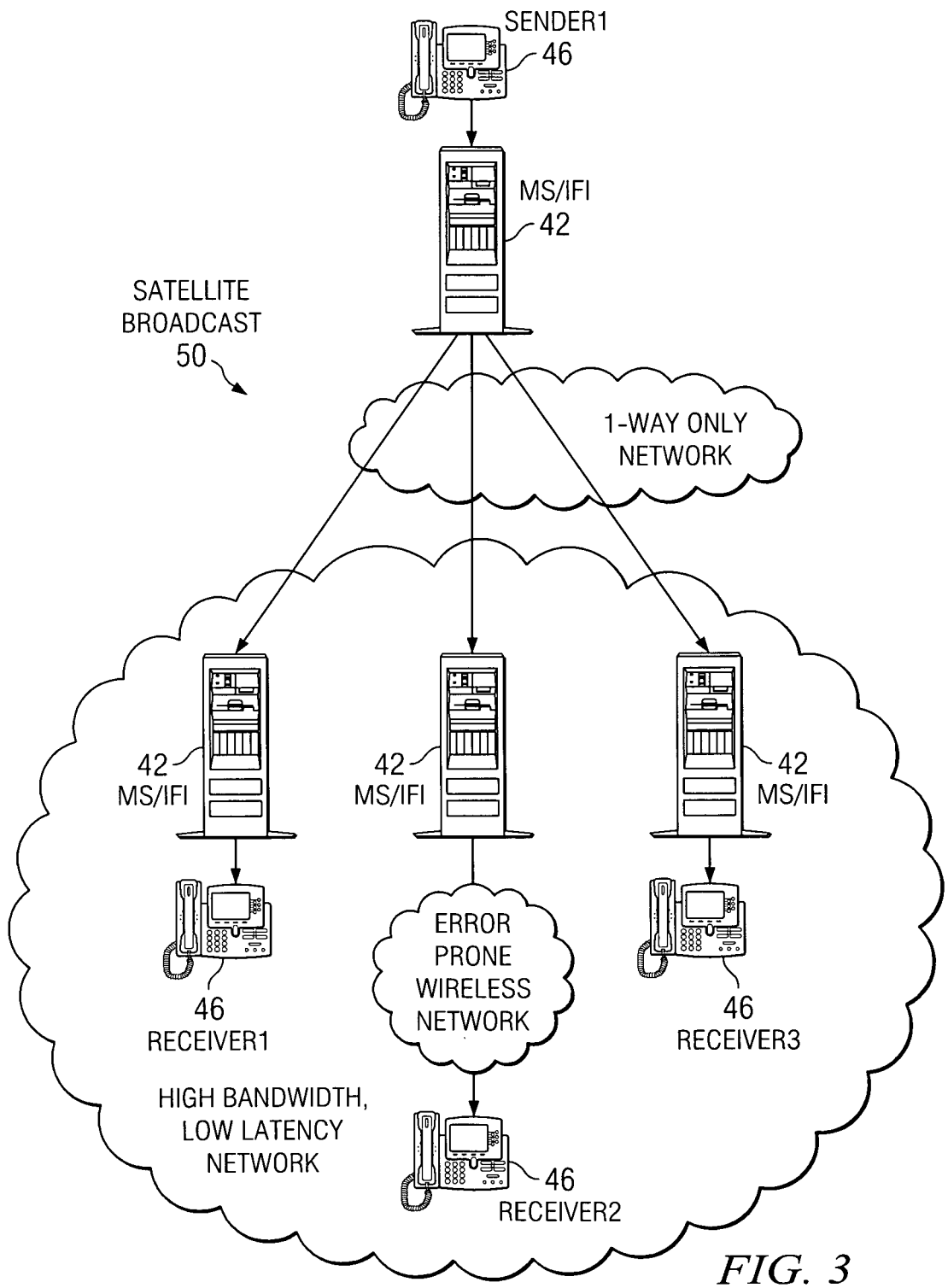
FIG. 3 is a simplified block diagram of an example satellite broadcast configuration in accordance with one example implementation of the present invention.

FIG. 3 is a simplified block diagram of an alternative embodiment of the present invention in which a satellite broadcast 50 configuration is employed. In such a case, a one-way network is provided that straddles two media switches 42 (one of which is coupled to a sender and the other to multiple receivers). In addition, an error prone wireless network is provided between a given media switch 42 and receiver 46.

As is illustrated, the I-frame injector can be useful in one-way broadcast scenarios if the core of the network consists of a one-way satellite link. Fast update requests cannot travel through the one-way link back to the sender. The injector can be situated after the one-way path and before the edge. If there is packet drop between the sender and the injector, the injector can potentially detect the dropped packet before the receiver and can send a fast update to the sender more quickly. Note that the I-frame injector can be incorporated into QoS video proxies, which often reside at the LAN/WAN interface.

The I-frame injector can be used to provide fast video updates for data sharing applications that are transmitted via video encoded bit-streams. In some circumstances, slides may have large gaps of time between I-frames, and may have a slow process of refreshing all the macroblocks. An I-frame injector can provide a full I-frame to endpoints that have either lost a packet, or to endpoints that join a conference midway. Also, because the I-frame encoder does not need to perform motion estimation, the decoding and encoding process can be implemented on a RISC processor (or other devices), without leveraging DSPs. In addition to CPU calculations, much of the codec processing involves transferring chunks of video from place to place in memory, which requires DMA controllers, which most network devices (e.g. routers) have. I-frame injectors can also assist in issuing I-frames for streams leaving an MS. In a VAS conference, the audio bridge can determine the loudest speaker and cause the MS controlling that endpoint's subnet to send video from that endpoint over the network. Typically, the MS will ask the endpoint to issue an I-frame shortly afterward. However, it may be faster to use an I-frame injector on the MS to generate an I-frame for the outgoing stream, rather than to go through the process of asking the endpoint to do it.

In the context of configurations, it should be noted that the I-frame injector may be provided within (or coupled to) one media switch 26 or multiple (or all) media switches 26 where appropriate. These elements may also be built as a single module to be included in the core of media switches 26. The I-frame injector is provided in software in accordance with one embodiment. Alternatively, the I-frame injector may be provided in hardware, in an application specific integrated circuit (ASIC), an algorithm, a processor, a field programmable gate array (FPGA), an electrically erasable programmable read-only memory (EEPROM), an erasable programmable read-only memory (EPROM), or any other component, device, object, or element.

Additionally, each media switch 26 may include or be replaced by video bridge 14 and/or audio bridge 16 in accordance with one embodiment of the present invention. Alternatively, these two elements may be positioned in any suitable location or provided externally such that each of video bridge 14 and audio bridge 16 may be separate (potentially central) components, devices, or modules or combined where appropriate and based on particular needs. For example, audio bridge 16 and video bridge 14 may be provided in a router, a gateway, a switch, a loadbalancer, or in any other suitable location operable to facilitate their operations. In alternative embodiments, each media switch 26 may include any other suitable hardware, software, algorithms, processors, devices, components, objects, ASICs, or elements operable to facilitate the video-conferencing capabilities and operations thereof, as described herein in this document.

Each audio bridge 16 and video bridge 14 may be equipped with an audio mixer and video mixer respectively. Note that in certain instances in the industry, terms such as 'video mixer' and 'video bridge' denote the same meaning and are used interchangeably. However, a video mixer (as used herein in this document) is defined as being within the scope of the term 'video bridge 14.' The terms 'audio bridge' and 'audio mixer' can be interpreted similarly. In a particular embodiment of the present invention, each audio bridge 16 and video bridge 14 may include suitable software to provide the capabilities of distributed video conferencing or to execute the operations of communication system 10 as described herein. In other embodiments, these functionalities may be provided within a given network element (as described above) or performed by suitable hardware, algorithms, processors, devices, ASICs, components, objects, or elements. Note that any combination of these elements may also be used in given applications of video conferencing within communication system 10.

In the architecture of communication system 10, the video-capable end points may exchange signaling messages directly with the call agent (using H.323, SIP, SCCP+), but have their media streams directed to a local MS assigned to the end point location. Both the audio and video streams may be connected to the local MS without knowledge of where the network is actually routing or processing the media. This allows the core of the network to implement the video conferencing service in different ways without affecting the operation of end points 12.

Audio streams may be continuously propagated by media switches to the audio mixers for speaker selection based on energy levels. Audio distribution may use point-to-point bi-directional streams for all its connections, while the video distribution relies on uni-directional connections between the media switches.

Figure 4A:
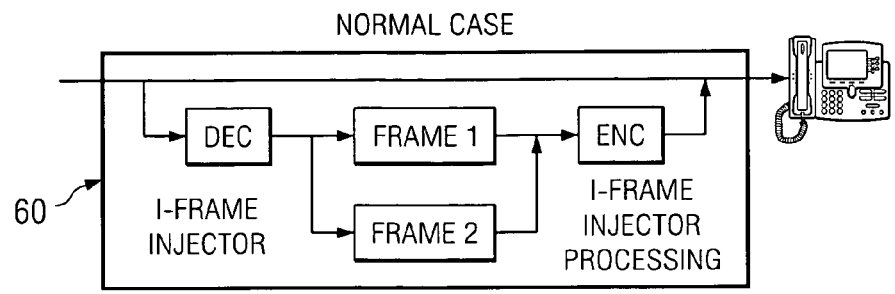
FIGS. 4A-4B are simplified block diagrams of example arrangements associated with the I-frame injector processing.
Figure 4B:
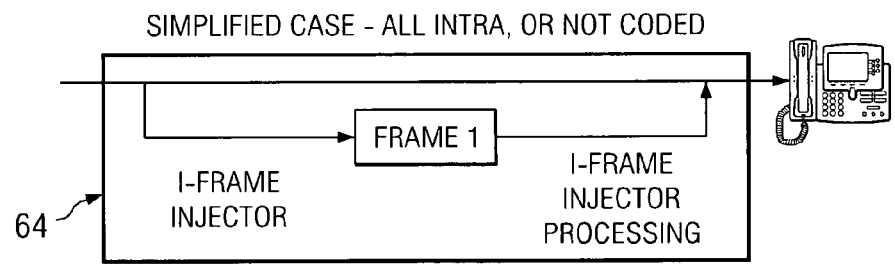

FIGS. 4A-4B are simplified block diagrams that illustrate several processing scenarios associated with the present invention. In FIG. 4A, a processing arrangement 60 is illustrated as the normal case. In FIG. 4B, a processing arrangement 64 is illustrated for a simplified case.

When not servicing FVU requests, the injector uses a relatively small amount of CPU to decode all incoming streams. A CPU of limited processing 'horsepower' can provide I-frame injection for a number of endpoints, as long as the endpoints do not all ask for a FVU simultaneously. In cases of multiple simultaneous I-frame requests, it may be possible for the I-frame injector to handle them one at a time and still provide I-frames faster than the originating source. For an I-frame request storm, an MS with limited horsepower will not have enough CPU resources and not all I-frame requests get a fast I-frame response. In this case, the injector falls back to passing the FVU upstream.

The I-frame injector is scalable. If the MS has only a few MIPs, then the technique presented here can be applied to just a few incoming streams. Candidate streams for I-frame processing include: 1) streams going to error-prone networks; and 2) streams coming from source endpoints that encounter the most delay: traveling from source to destination. The round-trip delay of these paths is higher and will cause higher FVU request delays.

Additional candidate streams for I-frame processing include streams coming over WAN links of low bandwidth, where I-frames would consume substantial resources. There may be a one-frame delay introduced for the decode/encode. If the endpoints are delaying video to sync with audio, the extra delay is absorbed by the video buffer in the endpoint and is hidden. If the endpoints are not delaying video, an extra one-frame delay is possibly less worrisome than waiting even longer for an I-frame from the originating sender.

A simplified version of the I-frame injector can also be used in the special case where the bit-stream contains blocks that are either not-coded or intra-only. This bit-stream might be used if the sender does not have enough MIPs to create P-blocks, or if the bit-stream needs to be resilient to packet loss. In this case, the injector can maintain the state of the prediction buffer in the encoded domain, without decoding the stream, by splicing the bit-stream. In this case, the injector consumes much less CPU.

It should be noted that communication system 10 offers a smart network core capable of providing video conferencing services to both legacy as well as new advanced end points. Communication system 10 can also isolate complexities from the end points in order to allow for inter-operability with legacy terminals without precluding a set of new services available to new smart and flexible end points. Additionally, communication system 10 has a number of applications other than video conferencing, which are made possible with this architecture. For example, communication system 10 could be used in: 1) call center supervisor monitoring and conferencing; 2) distributed security cameras monitoring (e.g. police department applications that allow individual units to monitor any of a set of cameras distributed through town); 3) streaming into video conferences; and 4) video conference broadcasting.

With regard to the overall flexibility of the present invention, the architecture of communication system 10 can also fit into different call control models. For example, communication system 10 could be modeled in the centralized call processing environment. In such a model, the centralized call processing cluster provides call processing and call control services for the edge of the network while the conference manager application controls the streaming between MSs. This is accomplished by the conference manager application interacting with both the centralized call processing cluster (for call admission control, bandwidth reservation, MS registration and security services) and MSs (for network core media distribution and processing). In the context of a centralized call processing environment, the architecture may consist of multiple layers: a) the edge layer (where calls and media are established between the end points and the media devices); and b) the core layer (where the media generated by conference end points is distributed among the MSs to finally reach the end points interested in viewing the streams based on the media policies of the conference). Note that the core and edge layer embodiments also apply to the distributed model because of the application to the media processing layer and not the signaling layer. Media streams may also potentially be distributed and processed by intermediate MSs to accommodate different end point capabilities within one conference (e.g. video transrating, video transcoding, video composition).

Communication system 10 could also readily be applied to a purely SIP environment. In such an architecture, the conference manager application (representing the SIP focus service), signals directly with the SIP end points and the MSs (representing the SIP cascaded mixers).

Note that communication system 10 may be generally agnostic as to whether a conference is scheduled in advance (scheduled conferencing) or as to whether it is setup at the conference start time (ad-hoc conferencing). It is up to applications (e.g. centralized call processing conference button, centralized call processing MeetMe, scheduler, reservationless MeetMe, etc.) running at the highest level to present such services to the end-users, while interacting with the conference manager application in order to deliver them.

Figure 5A:
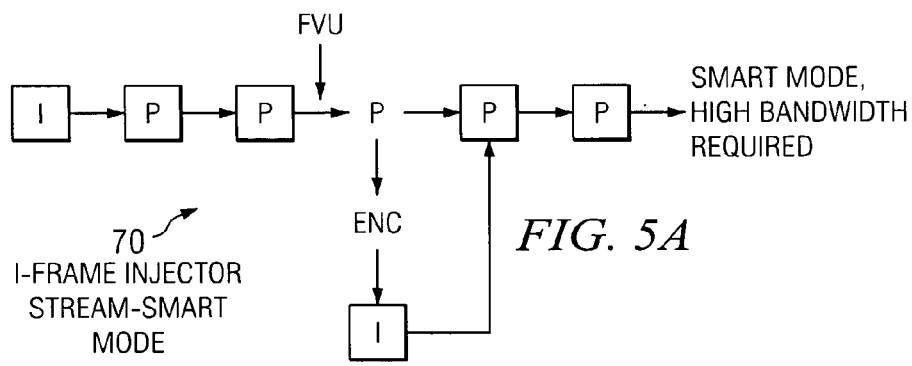
Figure 5B:
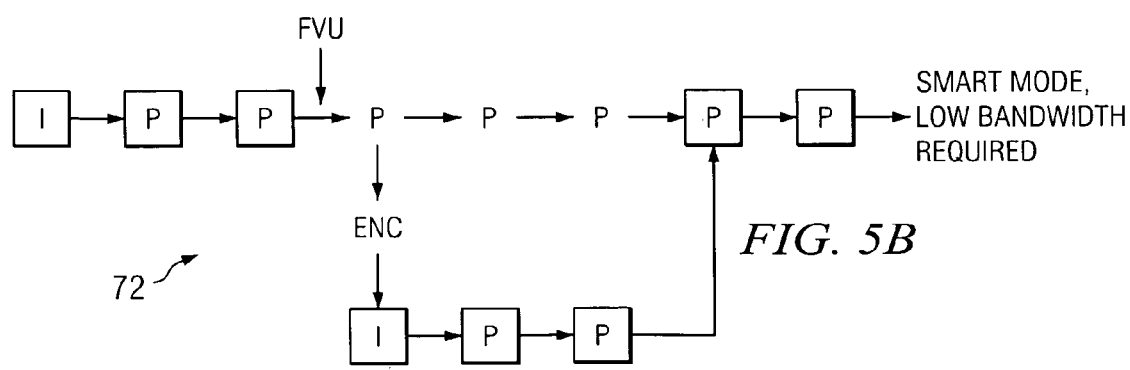

FIGS. 5A-5G are simplified flow diagrams that illustrate some operations associated with the present invention. It should be noted that the behavior of the I-frame injector depends on its intelligence, as well as the bandwidth capacity of the destination network/endpoint of the outgoing stream. FIGS. 5A and 5B are reflective of an I-frame injector stream in the smart mode. In particular, an arrangement 70 is provided to reflect the smart mode with a high bandwidth requirement, whereas an arrangement 72 is provided to illustrate the smart mode with a low bandwidth requirement.

For the smart mode, high bandwidth case, the injector intercepts the I-frame request and does not pass it upstream. It encodes an I-frame that exactly matches the most recently decoded video frame from the sender. This encoded frame is going to be large because it must be (pixel-for-pixel) identical to the most recently decoded frame that is coming from the sender. The injector then switches over to the sender's stream starting with the next frame and everything remains in sync. This is somewhat straightforward for I-frames and P-frames, but the same concept can easily work with B-frames.

For the smart mode, low bandwidth case, the injector intercepts the I-frame request and does not pass it upstream. It then encodes a new stream, spreading the bandwidth over a series of frames. The first injected frame is a lower bit-rate I-frame that does not quite match the sender's stream. The injector then sends a series of P-frames until the injected stream syncs up with the sender's stream, then the injector switches over to the original stream.

FIG. 5C represents the case where the I-frame injector stream is in the dumb mode. An arrangement 74 is provided to illustrate this operation. In the dumb mode, the I-frame injector lets the I-frame request pass up to the sender. Until that I-frame arrives, the injector re-encodes the sender's stream, creating an immediate I-frame. When an I-frame comes from the sender, the injector switches over to the sender's stream. In this mode, the FVU still gets sent to the sender, but the receiver gets an I-frame sooner.

FIGS. 5D-5G are simplified flow diagrams, which further detail some of the example operations of the present invention. FIG. 5D illustrates a smart mode, low bandwidth implementation. A configuration 76 is provided, whereby a set of frames 80 and 82 are included in the flow. These two frames must decode to the exact same image in order to switch back to the original stream in a seamless fashion.

FIG. 5E illustrates ENCi details, whereby a set of flows 86 and 88 are provided. In the case of flow 86, the ENCi decodes $P_1$ and then re-encodes it as an I-frame $I_1$. In the case of flow 88, the IFI is always decoding the incoming stream into a buffer. Hence, this DEC operation (which is illustrated) happens at all times, even when not servicing an FVU.

FIG. 5F illustrates ENCp details, whereby a set of flows 90 and 92 are provided. In these cases, the ENCp decodes $P_1$ and $P_2$, then encodes the difference to create $P_3$. In the instance of flow 92, the IFI is always decoding the incoming stream into a buffer so the DEC operation (specifically identified by the arrow of 92) happens at all times. This is true even when not servicing an FVU.

FIG. 5G illustrates additional details related to the smart mode, low bandwidth scenario. An arrangement 94 is provided and comprises several frames, including: an $I_1$ 96, a $P_4$ 99, and a $P_{e2}$ 98. With respect to the I-frame 96, if it takes too long to encode $I_1$, and if $I_1$ gets delayed, it may be optimal to skip $P_2$ and create $P_{e1}$ using $P_3$ instead of $P_2$. This would operate to keep uniform spacing between output frames. $P_3$ is similar to $P_2$, which would allow such a paradigm to work. Note that $P_4$ and $P_{e2}$ should decode to the exact same image in order to switch back to the original stream seamlessly.

Some of the steps illustrated in previous FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that described operational flows provide just one of a myriad of potential implementations of communication system 10.

Although the present invention has been described in detail with reference to video-conferencing communications, communication system 10 may be used for any protocol involving routing, mapping, or redirection of streaming information in any communications environment. Any suitable communications that involve two or more participating entities may benefit from the teachings of the present invention. The use of video-conferencing communications has only been offered for purposes of teaching and should not be construed to limit the scope of the present invention in any way.

Moreover, although the present invention has been described with reference to a number of elements included within communication system 10, these elements may be rearranged or positioned in any appropriate manner to accommodate any suitable routing configurations. In addition, any of these elements may be provided as separate external components to communication system 10 or to each other where appropriate. For example, the I-frame injector may be provided within or external to media switch 26 in a single module or component that is operable to execute the operations of distributed video conferencing as identified herein. The present invention contemplates great flexibility in the arrangement of these elements as well as their internal components.

Additionally, although the present invention has been discussed in the context of specific implementations, the basic idea of the architecture can be used for any situation that involves distributed videoconferencing, where video streams should be sent over a network with limited bandwidth. Moreover, it should also be noted that any of the networks identified in the previous FIGURES may be easily replaced (or work in cooperation) with any local area network (LAN), metropolitan area network (MAN), wireless local area network (WLAN), virtual private network (VPN), intranet, or any other appropriate architecture or system that facilitates communications in a network environment.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus comprising:
   a memory configured to store computer executable code; and
   one or more processors coupled to the memory, the processors configured, when executing the code, to:
   send a stream from a sender to a receiver, a plurality of endpoints comprising the sender and the receiver;
   intercept an I-frame request from the receiver;
   establish a destination bandwidth capacity associated with the receiver;
   operate in a high bandwidth mode selected from a plurality of modes according to the destination bandwidth capacity;
   encode one or more frames according to the selected mode, the frames comprising an I-frame that matches a decoded video frame from the sender; and
   resume sending the stream from the sender to the receiver at a next frame.

2. The apparatus of claim 1, the one or more processors further configured to:
   operate in a low bandwidth mode;
   encode a new stream over a plurality of frames comprising a lower bit-rate I-frame;
   sending a plurality of P-frames until the new stream is synched with the stream from the sender; and
   switch from the new stream back to the stream from the sender when the new stream is synched with the stream.

3. The apparatus of claim 1, the one or more processors further configured to:
  operate in a dumb mode;
  pass the I-frame request to the sender; and
  receive an I-frame from the sender;
  re-encode the stream from the sender until an I-frame is received from the sender; and
  switch to the stream from the sender when the I-frame is received from the sender.

4. The apparatus of claim 1, the destination bandwidth capacity comprising a bandwidth capacity of the receiver.

5. The apparatus of claim 1, the destination bandwidth capacity comprising a bandwidth capacity of a network of the receiver.

6. The apparatus of claim 1, the one or more processors further configured to:
  determine if the sender corresponds to an active speaker;
  continue the stream from the sender if the sender corresponds to an active speaker; and
  suppress the stream from the sender if the sender does not correspond to an active speaker.

7. The apparatus of claim 1, the one or more processors further configured to:
  continue the stream from the sender if the stream comprising an audio stream; and
  suppress the stream from the sender if the stream comprising a video stream.

8. The apparatus of claim 1, the one or more processors further configured to:
  replicate the sender stream for more than one endpoint.

9. The apparatus of claim 1, the I-frame request comprising a fast video update (FVU) request.

10. A method comprising:
  performing the following by an endpoint of a plurality of endpoints comprising a sender and a receiver:
    sending a stream from the sender to the receiver;
    intercepting an I-frame request from the receiver;
    establishing a destination bandwidth capacity associated with the receiver;
    operating in a high bandwidth mode selected from a plurality of modes according to the destination bandwidth capacity;
    encoding one or more frames according to the selected mode, the frames comprising an I-frame that matches a decoded video frame from the sender; and
    resuming sending the stream from the sender to the receiver at a next frame.

11. The method of claim 10, further comprising:
  operating in a low bandwidth mode;
  encoding a new stream over a plurality of frames comprising a lower bit-rate I-frame;
  sending a plurality of P-frames until the new stream is synched with the stream from the sender; and
  switching from the new stream back to the stream from the sender when the new stream is synched with the stream.

12. The method of claim 10, further comprising:
  operating in a dumb mode;
  passing the I-frame request to the sender; and
  receiving an I-frame from the sender;
  re-encoding the stream from the sender until an I-frame is received from the sender; and
  switching to the stream from the sender when the I-frame is received from the sender.

13. The method of claim 10, the destination bandwidth capacity comprising a bandwidth capacity of the receiver.

14. The method of claim 10, the destination bandwidth capacity comprising a bandwidth capacity of a network of the receiver.

15. The method of claim 10, further comprising:
  determining if the sender corresponds to an active speaker;
  continuing the stream from the sender if the sender corresponds to an active speaker; and
  suppressing the stream from the sender if the sender does not correspond to an active speaker.

16. The method of claim 10, further comprising:
  continuing the stream from the sender if the stream comprising an audio stream; and
  suppressing the stream from the sender if the stream comprising a video stream.

17. The method of claim 10, further comprising:
  replicating the sender stream for more than one endpoint.

18. The method of claim 10, the I-frame request comprising a fast video update (FVU) request.

* * * * *